United States Patent
Luo et al.

(10) Patent No.: US 12,058,742 B2
(45) Date of Patent: Aug. 6, 2024

(54) METHODS AND APPARATUSES FOR TIMING ADVANCE ADJUSTMENT IN UPLINK TRANSMISSION

(71) Applicants: SHARP KABUSHIKI KAISHA, Sakai (JP); FG Innovation Company Limited, New Territories (HK)

(72) Inventors: Chao Luo, Shanghai (CN); Renmao Liu, Shanghai (CN)

(73) Assignees: SHARP KABUSHIKI KAISHA, Sakai (JP); FG Innovation Company Limited, New Territories (HK)

( * ) Notice: Subject to any disclaimer, the term of this patent is extended or adjusted under 35 U.S.C. 154(b) by 374 days.

(21) Appl. No.: 17/598,450

(22) PCT Filed: Mar. 24, 2020

(86) PCT No.: PCT/CN2020/080846
§ 371 (c)(1),
(2) Date: Sep. 27, 2021

(87) PCT Pub. No.: WO2020/192647
PCT Pub. Date: Oct. 1, 2020

(65) Prior Publication Data
US 2022/0191938 A1 Jun. 16, 2022

(30) Foreign Application Priority Data
Mar. 26, 2019 (CN) .......................... 201910236043.2

(51) Int. Cl.
*H04W 74/0833* (2024.01)
*H04L 5/00* (2006.01)
(Continued)

(52) U.S. Cl.
CPC ....... *H04W 74/0833* (2013.01); *H04L 5/0051* (2013.01); *H04L 27/26025* (2021.01);
(Continued)

(58) Field of Classification Search
None
See application file for complete search history.

(56) References Cited

U.S. PATENT DOCUMENTS 10,368,367 B2 *  7/2019 Chae .................... H04W 72/21
11,121,765 B2 *  9/2021 Kim .................... H04B 7/18541
(Continued)

FOREIGN PATENT DOCUMENTS

CN        109451586 A       3/2019

OTHER PUBLICATIONS

NTT DOCOMO, Inc., New WID on New Radio Access Technology, 3GPP TSG RAN Meeting #75, RP-170855, Dubrovnik, Croatia, Mar. 6-9, 2017.
(Continued)

*Primary Examiner* — Faiyazkhan Ghafoerkhan
(74) *Attorney, Agent, or Firm* — ScienBiziP, P.C.

(57) ABSTRACT

A method performed by a user equipment for wireless communication and a user equipment are provided. The method includes: receiving a timing advance command in uplink slot n; and determining, according to a time when the timing advance command is received, a time for applying an uplink transmission timing adjustment starting from a start of uplink slot n+k+1, wherein: k is determined according to a duration of $N_1$ symbols; n, k, and $N_1$ are all integers; and a value of $N_1$ corresponds to at least one of the following: a physical downlink shared channel (PDSCH) decoding time defined by PDSCH processing capability 1 when a reference processing capability assumption is true; a PDSCH decoding time defined by the PDSCH processing capability 1 when a PDSCH demodulation reference signal (DM-RS) is configured.

11 Claims, 4 Drawing Sheets

(51) Int. Cl.
  *H04L 27/26* (2006.01)
  *H04W 72/044* (2023.01)
  *H04W 72/1273* (2023.01)
  *H04W 74/00* (2009.01)

(52) U.S. Cl.
  CPC ..... *H04W 72/044* (2013.01); *H04W 72/1273* (2013.01); *H04W 74/008* (2013.01)

(56) References Cited

U.S. PATENT DOCUMENTS

| | | | |
|---|---|---|---|
| 11,399,410 B2* | 7/2022 | Islam | H04W 80/02 |
| 2017/0171880 A1* | 6/2017 | Chae | H04W 56/0045 |
| 2017/0202007 A1* | 7/2017 | Miao | H04L 5/0055 |
| 2018/0020335 A1* | 1/2018 | Yin | H04W 28/0268 |
| 2020/0015316 A1* | 1/2020 | Islam | H04W 56/0045 |
| 2020/0153500 A1* | 5/2020 | Kim | H04B 7/18541 |
| 2022/0191938 A1* | 6/2022 | Luo | H04W 72/1273 |

OTHER PUBLICATIONS

Vodafone, New SID: Study on NR V2X, 3GPP TSG RAN Meeting #80, RP-181429, La Jolla, USA, Jun. 11-14, 2018.

NTT DOCOMO, New SID Proposal: Study on New Radio Access Technology, 3GPP TSG RAN Meeting #71, RP-160671, Goteborg, Sweden, Mar. 7-10, 2016.

Samsung, "CR to 38.213 capturing the RAN1#94bis and RAN1#95 meeting agreements", R1-1814394, 3GPP TSG RAN WG1 Meeting #95, Spokane, USA, Nov. 12-16, 2018.

CATT, "Further details on NR RACH format", R1-1806271, 3GPP TSG RAN WG1 Meeting #93, Busan, Korea, May 21-25, 2018.

* cited by examiner

METHODS AND APPARATUSES FOR TIMING ADVANCE ADJUSTMENT IN UPLINK TRANSMISSION

CROSS-REFERENCE TO RELATED APPLICATION(S)

This application is a national stage application of International Patent Application PCT/CN2020/080846, filed Mar. 24, 2020, now published as WO/2020/192647. International Patent Application PCT/CN2020/080846 claims the benefit of CN Patent Application 201910236043.2, filed Mar. 26, 2019. CN Patent Application 201910236043.2 and International Patent Application PCT/CN2020/080846, now published as WO/2020/192647, are incorporated herein by reference.

TECHNICAL FIELD

The present invention relates to the field of wireless communications technologies, and specifically, to a method performed by user equipment and corresponding user equipment.

BACKGROUND

In March 2016, a new research project on 5G technical standards (see Non-Patent Document 1) was approved at the 3rd Generation Partnership Project (3GPP) RAN #71 plenary meeting. The purpose of this research project is to develop New Radio (NR) access technology to meet all application scenarios, requirements, and deployment environments of 5G. NR has three main application scenarios: Enhanced Mobile Broadband (eMBB) communication, massive Machine Type Communication (mMTC), and Ultra-Reliable and Low Latency Communications (URLLC). In June 2017, a corresponding 5G NR work project (see Non-Patent Document 2) was approved at the 3GPP RAN #75 plenary meeting.

The waveform supported by 5G in a downlink direction is Cyclic Prefix Orthogonal Frequency Division Multiplexing (CP-OFDM), and the waveforms supported in an uplink direction include CP-OFDM and Discrete Fourier Transformation Spread Orthogonal Frequency Division Multiplexing (DFT-s-OFDM). Each waveform supports a plurality of combinations of subcarrier spacings (SCSs) and cyclic prefix (CP) lengths. Sometimes, a given SCS, or a combination of an SCS and a CP length is referred to as a "numerology." Numerologies supported by 5G are shown in Table 1, which defines two CP types, "normal" and "extended". Each SCS (indicated by $\Delta f$, in units of k Hz) corresponds to a "SCS configuration" (indicated by $\mu$).

TABLE 1

Numerologies supported by 5G

| $\mu$ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal, extended |
| 3 | 120 | Normal |
| 4 | 240 | Normal |

The basic time unit of 5G is $T_c = 1/(\Delta f_{max} \cdot N_f)$ seconds, where $\Delta f_{max} = 480 \cdot 10^3$ Hz and $N_f = 4096$. The constant $\kappa = T_s/T_c = 64$, where $T_s$ is the basic time unit of Long Term Evolution (LTE), $T_s = 1/(\Delta f_{ref} \cdot N_{f,ref})$ seconds, $\Delta_{f,ref} = 15 \cdot 10^3$ Hz, and $N_{f,ref} = 2048$.

In the time domain, the length of a 5G radio frame (or system frame, sometimes referred to as a frame for short, with a frame number ranging from 0 to 1023) is 10 milliseconds. Each frame includes 10 subframes (with a subframe number in the frame ranging from 0 to 9) with a length of 1 millisecond, each subframe includes $N_{slot}^{subframe,\mu}$ slots (with a slot number in the subframe ranging from 0 to $N_{slot}^{subframe,\mu}-1$), and each slot includes $N_{symb}^{slot}$ OFDM symbols. Table 2 shows the values of $N_{symb}^{slot}$ and $N_{slot}^{subframe,\mu}$ in different SCS configurations. Obviously, the number of OFDM symbols in each subframe $N_{symb}^{subframe,\mu} = N_{symb}^{slot} N_{slot}^{subframe,\mu}$. In addition, each frame is further divided into two half-frames of the same size, in which the first half frame (half-frame 0) includes subframes 0 to 4, and the second half frame (half-frame 1) includes subframes 5 to 9.

TABLE 2

Time domain parameters related to SCS configuration $\mu$

| $\mu$ | $N_{symb}^{slot}$ | $N_{slot}^{subframe,\mu}$ |
| --- | --- | --- |
| 0 | 14 | 1 |
| 1 | 14 | 2 |
| 2 | 14 | 4 |
| 3 | 14 | 8 |
| 4 | 14 | 16 |

A 5G base station can use a physical downlink shared channel (PDSCH) for downlink data transmission, and correspondingly, user equipment (UE) can use a physical uplink control channel (PUCCH) to transmit an HARQ-ACK for the downlink data. Since the UE needs a certain time to perform demodulation, decoding, and other operations on the received PDSCH, an initial transmission time of the HARQ-ACK is no earlier than symbol $L_1$, where $L_1$ is a next complete uplink symbol after $T_{proc,1} = (N_1 + d_{1,1})(2048 + 144) \cdot \kappa 2^{-\mu} \cdot T_c$ from the end of the last symbol of the PDSCH (i.e., a CP of the uplink symbol starts after $T_{proc,1}$ from the end of the last symbol of the PDSCH).

In the above equation for $t_{proc,1}$, the value of $N_1$ is related to a PDSCH processing capability of the UE. 5G defines two PDSCH processing capabilities: PDSCH processing capability 1 and PDSCH processing capability 2, where a method of determining $N_1$ corresponding to PDSCH processing capability 1 is shown in Table 3, and a method for determining $N_2$ corresponding to PDSCH processing capability 2 is shown in Table 4.

If the PDSCH uses PDSCH mapping type A, and a demodulation reference signal (DM-RS) of the PDSCH is configured as a single-symbol DM-RS, and a higher-layer parameter dmrs-AdditionalPosition is configured as pos1, and the duration (referred to as $l_d$, in units of the number of symbols) between the first orthogonal frequency division multiplexing (OFDM) symbol of a slot where the PDSCH is located and the last OFDM symbol of the PDSCH is equal to 13 or 14, the position $l_1$ of the second DM-RS symbol of the PDSCH may be equal to 11, or may be equal to 12, depending on other system configuration parameters. When $l_1 = 12$, $N_{1,0} = 14$ in Table 3.

In all other cases, $N_{1,0} = 13$.

TABLE 3

PDSCH processing time defined for PDSCH processing capability 1

PDSCH decoding time $N_1$ (number of symbols)

| μ | dmrs-AdditionalPosition in DMRS-DownlinkConfig in dmrs-DownlinkForPDSCH-MappingTypeA and dmrs-DownlinkForPDSCH-MappingTypeB is equal to pos0 | dmrs-AdditionalPosition in DMRS-DownlinkConfig in any one of dmrs-DownlinkForPDSCH-MappingTypeA and dmrs-DownlinkForPDSCH-MappingTypeB is not equal to pos0 or the higher-layer parameter is not configured |
|---|---|---|
| 0 | 8 | $N_{1,0}$ |
| 1 | 10 | 13 |
| 2 | 17 | 20 |
| 3 | 20 | 24 |

TABLE 4

PDSCH processing time defined for PDSCH processing capability 2

| μ | PDSCH decoding time $N_1$ (number of symbols) dmrs-Additional Position in DMRS-DownlinkConfig in dmrs-DownlinkForPDSCH-MappingTypeA and dmrs-DownlinkForPDSCH-MappingTypeB is equal to pos0 |
|---|---|
| 0 | 3 |
| 1 | 4.5 |
| 2 | 9 (to FR1) |

In addition to the aforementioned threshold for defining the transmission time of the HARQ-ACK for the PDSCH, the "PDSCH decoding time" $N_1$ defined in Table 3 is also used as a time threshold related to PDSCH processing in other cases. For example, in the following four cases. $N_{T,1}$ all represents the duration of $N_1$ symbols (in units of milliseconds), where $N_1$ corresponds to the PDSCH decoding (or receiving) time defined by UE processing capability 1 when an additional PDSCH DM-RS is configured, where the "additional PDSCH DM-RS configured" may be considered equivalent to that "dmrs-AdditionalPosition in DMRS-DownlinkConfig in any one of dmrs-DownlinkForPDSCH-MappingTypeA and dmrs-DownlinkForPDSCH-MappingTypeB is not equal to pos0, or the higher-layer parameter is not configured" in Table 3.

For a timing advance (TA) command received in uplink slot n, a corresponding time for applying an uplink transmission timing adjustment starts from the start of uplink slot n+k+1, where $$k = \lceil N_{slot}^{subframe,\mu} \cdot (N_{T,1} + N_{T,2} + N_{TA,max} + 0.5)/T_{sf} \rceil.$$

An SCS used in determination of $N_1$ corresponding to $N_{T,1}$ is the smallest SCS in the following: the SCS used by all uplink bandwidth parts (BWPs) configured in all uplink carriers configured in the TAG indicated by the timing advance command; and the SCS used by all downlink BWPs configured in downlink carriers corresponding to all the uplink carriers.

In a random access procedure, if the UE does not detect a downlink control information (DCI) format 1_0 with a cyclic redundancy check (CRC) scrambled with a random access radio network temporary identifier (RA-RNTI) in a random access response (RAR) window after transmitting a physical random access channel (PRACH), or does not correctly receive a transport block in the corresponding PDSCH in the RAR window, or a higher layer does not identify a random access preamble identity (RAPID) associated with the PRACH transmission from the UE, the higher layer may instruct a physical layer to transmit (or retransmit) the PRACH. In this case, a time when the UE transmits tor retransmits) the PRACH should be no later than $N_{T,1}+0.75$ milliseconds after the last symbol of the window or $N_{T,1}+0.75$ milliseconds after the last symbol of the PDSCH reception. The SCS used in determination of $N_1$ corresponding to $N_{T,1}$ may be an SCS of the PDSCH.

In a random access procedure, the UE may assume the minimum time between the last symbol of the PDSCH carrying an RAR message (including an RAR uplink (UL) grant) and the corresponding physical uplink shared channel (PUSCH)transmission scheduled by the RAR uplink grant is equal to $N_{T,1}+N_{T,2}+0.75$. The SCS used in determination of $N_1$ corresponding to $N_{T,1}$ and $N_2$ corresponding to $N_{T,2}$ may be the smaller one of the SCSs configured by the PDSCH and the PUSCH.

When the UE is not provided with the cell radio network temporary identifier (C-RNTI), in the random access procedure, after transmitting the PUSCH scheduled by the RAR uplink grant, the UE attempts to detect that a PDSCH including a UE contention resolution identity and scheduled by the DCI format 1_0 with a CRC scrambled with a temporary cell radio network temporary identifier (TC-RNTI) (in this case, it may also be said that the PDSCH carries Msg4). After receiving the PDSCH, the UE transmits an HARQ-ACK on the PUCCH on an active uplink BWP where the PUSCH is located. The minimum time between the last symbol of the PDSCH and the first symbol of the PUCCH is equal to $N_{T,1}+0.75$ milliseconds. The SCS used in determination of $N_1$ corresponding to $N_{T,1}$ may be the SCS of the PDSCH received in the RAR window.

In the existing 3GPP standards on 5G, the mechanism related to transmission timing adjustment has at least the following problems. When a time to apply an uplink transmission timing adjustment, a time to retransmit a PRACH, a time to transmit a PUSCH scheduled by an RAR uplink grant, and a time to transmit a PUCCH for Msg4 are determined, it is necessary to determine the value of $N_{T,1}$ when an additional PDSCH DM-RS is configured, and the value of $N_{T,1}$ in turn depends on the value of the "PDSCH decoding time" $N_1$ defined in Table 3. When μ=0, since the value ($N_{1,0}$) of $N_1$ depends on whether the position of the second DM-RS symbol of the PDSCH is expressed as $l_1$ and the value of $l_1$, the description "$N_{T,1}$ represents the duration of $N_1$ symbols, where $N_1$ corresponds to the PDSCH decoding time defined by the UE processing capability 1 when an additional PDSCH DM-RS is configured" in the existing 3GPP standard specifications on 5G involves ambiguity, and UE and a base station cannot uniquely determine the value of $N_1$ on this basis.

In addition, V2X (Vehicle-to-Everything) communication refers to communication between a vehicle and any entity that may affect the vehicle. Typical V2X communication includes V2I (Vehicle-to-Infrastructure), V2N (Vehicle-to-Network), V2V (Vehicle-to-Vehicle), V2P (Vehicle-to-Pedestrian), etc.

The 3GPP LTE standards support V2V communication from Rel-14, and support V2X communication from Rel-15. In the 3GPP standard specifications, the interface between UE and UE for implementing device-to-device (D2D) discovery and D2D communication is referred to as PC5, which is also referred to as "direct link" or "sidelink" (SL) at the physical layer, so as to distinguish the sidelink from uplink (UL) and downlink (DL).

With the progress of 5G NR standardization work, and with 3GPP identifying more advanced V2X services (eV2X services) requirements, 3GPP V2X phase 3, i.e., NR V2X, has begun to be put on the agenda. In June 2018, a new research project on 3GPP NR V2X (see Non-Patent Document 3, hereinafter referred to as NR V2X research project, or V2X Phase 3 research project) was approved at the 3GPP RAN #80 plenary meeting. One of the goals of the NR V2X research project is to study the design of a new SL interface based on a 5G system.

In NR V2X, a physical layer of the SL interface supports broadcast, groupcast, and unicast transmission in in-coverage, out-of-coverage, and partial-coverage scenarios.

NR V2X supports an SL synchronization function. Related signals and channels include: a sidelink primary synchronization signal (SL PSS), also known as S-PSS, or primary sidelink synchronization signal (PSSS); a sidelink secondary synchronization signal (SL SSS), also known as S-SSS, or secondary sidelink synchronization signal SSSS); and a physical sidelink broadcast channel (PSBCH).

In NR V2X, the SL PSS, the SL SSS, and the PSBCH are organized into blocks on a time-frequency resource grid, called sidelink SS/PBCH blocks (SL SSBs), or S-SSBs. The transmission bandwidth of the SL SSBs is within a sidelink bandwidth part (SL BWP) configured for the UE. The SL PSS and/or the SL SSS may carry a sidelink synchronization identity, or sidelink synchronization signal identity (SL SSID), and the PSBCH may carry a sidelink master information block (SL MIB).

A synchronization source (sometimes referred to as synchronization reference) of NR V2X may include a global navigation satellite system (GNSS), a gNB, an eNB, and NR UE. The priority definition of the synchronization source is shown in Table 5. Among them, the UE determines whether to use "GNSS-based synchronization" or "gNB/eNB-based synchronization" through (pre)configuration information.

TABLE 5

NR V2X synchronization source priority

| Priority | GNSS-based synchronization | gNB/eNB-based synchronization |
|---|---|---|
| P0 | GNSS | gNB/eNB |
| P1 | All UE directly synchronized to GNSS | All UE directly synchronized to gNB/eNB |
| P2 | All UE indirectly synchronized to GNSS | All UE indirectly synchronized to gNB/eNB |
| P3 | Any other UE | GNSS |
| P4 | N/A | All UE directly synchronized to GNSS |
| P5 | N/A | All UE indirectly synchronized to GNSS |
| P6 | N/A | Any other UE |

In an out-of-coverage scenario and in an RRC_IDLE state, an SL BWP may be (pre-)configured on an NR V2X carrier. In an in-coverage scenario, there is only one valid (or activated) SL BWP on an NR V2X carrier. One or a plurality of resource pools (which refers to a set of time-frequency resources that can be used for SL transmission and/or reception) may be (pre-)configured on one SL BWP.

Resource allocation modes of NR V2X may be classified as follows: Mode 1: A base station schedules SL resources for SL transmission; and Mode 2: UE determines SL resources for SL transmission (i.e., the base station does not participate in the scheduling of the SL resources). Mode 2 may further be divided into the following situations: Sometimes, when the context is clear, for example, it can be seen from the context that a capability related to PDSCH processing is indicated, PDSCH processing capability 1 may also be referred to as UE processing capability 1.

Other channels involved in NR V2X include at least: a physical sidelink shared channel (PSSCH); a physical sidelink control channel (PSCCH); and a physical sidelink feedback channel (PSFCH).

In NR V2X, the UE schedules transmission of data carried by the PSSCH through sidelink control information (SCI) carried by the PSCCH. Depending on whether the scheduled transmission is unicast, groupcast, or broadcast transmission, and whether HARQ feedback is required, the SCI may include one or a plurality of the following: a layer-1 source identity (ID), or called a physical layer source ID; a layer-1 destination ID, or called a physical layer destination ID; an HARQ process ID, or called an HARQ process number; a new data indicator (NDI); and a redundancy version (RV).

In NR V2X, problems with design of an SL include at least: there may be collisions of scrambling sequences between SL channels transmitted by different UE; there may be collisions of UE IDs (especially short IDs, such as physical layer IDs) determined by different UE, resulting in failure to correctly identify source and/or destination UE IDs at the physical layer; and in GNSS-based SL synchronization, even if a base station has been synchronized to a GNSS, the base station still cannot serve as a synchronization source of the UE, greatly increasing the probability that the UE selects a low-priority synchronization source or even fails to select a synchronization source.

PRIOR ART DOCUMENTS

Non-Patent Documents

Non-Patent Document 1: RP-160671, New SID Proposal: Study on New Radio Access Technology Non-Patent Document 2: RP-170855, New WID on New Radio Access Technology Non-Patent Document 3: RP-181429, New SID: Study on NR V2X

SUMMARY

In order to resolve at least some of the aforementioned problems, one objective of the present invention is a method performed by user equipment and user equipment. By improving the definition of a reference processing capability assumption when PDSCH processing capability 1 is determined, UE and a base station can unambiguously determine consistent duration corresponding to PDSCH processing capability 1, so that the UE can adjust uplink transmission timing in a timely manner, accurately determine a time to retransmit a random access preamble, accurately determine a time of a PUSCH scheduled by an RAR uplink grant, or accurately determine a transmission time of an HARQ-ACK for a PDSCH including a UE contention resolution identity.

In order to achieve the above objective, according to the present invention, a method performed by a UE for wireless communication, the method comprises: receiving a timing advance command in uplink slot n; and determining, according to a time when the timing advance command is received, a time for applying an uplink transmission timing adjustment starting from a start of uplink slot n+k+1, wherein: k is determined according to a duration of $N_1$ symbols; n, k, and $N_1$ are all integers; and a value of $N_1$ corresponds to at least one of the following: a physical downlink shared channel (PDSCH) decoding time defined by PDSCH processing capability 1 when a reference processing capability assumption is true; a PDSCH decoding time defined by the PDSCH processing capability 1 when a PDSCH demodulation reference signal (DM-RS) is configured, the PDSCH decoding time is determined based on a minimum subcarrier spacing (SCS) among SCSs of all configured uplink bandwidth parts (BWPs) for all uplink carriers in a timing advanced group and of all configured downlink BWPs for corresponding downlink carriers, and $N_1$ is 14 when the minimum SCS is 15 kHz.

Preferably, the uplink slot n is a last slot of uplink slots that overlaps with one or a plurality of slots for performing PDSCH reception.

Additionally, according to the present invention, a method performed by a UE for wireless communication, the method comprises: transmitting a random access preamble; and instructing, by a higher layer of the UE, a physical layer to retransmit the random access preamble if the UE does not detect, in a random access response (RAR) window, a downlink control information (DCI) format 1_0 with a cyclic redundancy check (CRC) scrambled with a random access radio network temporary identifier (RA-RNTI), or if the UE does not correctly receive, in the RAR window, a transport block in a physical downlink shared channel (PDSCH) scheduled by the DCI format 1_0, or if the UE does not identify a random access preamble identity (RAPID), where: a time for the UE to retransmit the random access preamble is no later than a first time after a last symbol of the RAR window or a first time after a last symbol of a PDSCH reception, the first time is determined according to a duration of $N_1$ symbols, $N_1$ is an integer, a the value of $N_1$ corresponds to at least one of the following: a physical downlink shared channel (PDSCH) decoding time defined by PDSCH processing capability 1 when a reference processing capability assumption is true, a PDSCH decoding time defined by the PDSCH processing capability 1 when a PDSCH DM-RS is configured, the PDSCH decoding time is determined based on a minimum subcarrier spacing (SCS) among a SCS of a physical downlink control channel (PDCCH) carrying the DCI format 1_0, a SCS of a corresponding PDSCH when the PDSCH DM-RS is configured, and a SCS of the random access preamble, and $N_1$ is 14 when the minimum SCS is 15 kHz.

Additionally, according to the present invention, invention, a method performed by a UE, the method comprises: receiving a random access response (RAR) uplink grant included in an RAR message on a physical downlink shared channel (PDSCH); and transmitting a physical uplink shared channel (PUSCH) scheduled by the received RAR uplink grant, where: a minimum time between a last symbol of the PDSCH reception and the first symbol of the PUSCH transmission is determined according to a duration of $N_1$ symbols, and a value of $N_1$ corresponds to at least one of the following: a physical downlink shared channel (PDSCH) decoding time defined by PDSCH processing capability 1 when a reference processing capability assumption is true, a PDSCH decoding time defined by the PDSCH processing capability 1 when a PDSCH DM-RS is configured, the PDSCH decoding time is determined based on a minimum subcarrier spacing (SCS) among SCSs of the PDSCH and the PUSCH, and $N_1$ is 14 when the minimum SCS is 15 kHz.

Additionally, according to the present invention, invention, a method performed by user equipment, including: a step of detecting a DCI format 1_0 with a cyclic redundancy check (CRC) scrambled with a temporary cell radio network temporary identifier (TC-RNTI), and receiving a physical downlink shared channel (PDSCH) scheduled by the DCI format 1_0; and transmitting, on a physical uplink control channel (PUCCH), HARQ-ACK information for the PDSCH, where the minimum time between the last symbol of the PDSCH reception and the first symbol of the PUCCH transmission is determined according to the duration of $N_1$ symbols, and the value of $N_1$ corresponds to at least one of the following: a physical downlink shared channel (PDSCH) decoding time defined by PDSCH processing capability 1 when a reference processing capability assumption holds true, the maximum PDSCH decoding time defined by the PDSCH processing capability 1, the maximum PDSCH decoding time defined by the PDSCH processing capability 1 when an additional PDSCH demodulation reference signal (DM-RS) is configured, the minimum PDSCH decoding time defined by the PDSCH processing capability 1, and the minimum PDSCH decoding time defined by the PDSCH processing capability 1 when the additional PDSCH DM-RS is configured, where $N_1$ is an integer.

Preferably, the PDSCH includes a user equipment contention resolution identity.

Preferably, when the PDSCH DM-RS is configured, the reference processing capability assumption includes one or a plurality of the following: a configured value of dmrs-AdditionalPosition in DMRS-DownlinkConfig in the higher-layer parameter dmrs-DownlinkForPDSCHMappingTypeA is equal to "pos1"; and a configured value of dmrs-AdditionalPosition in DMRS-DownlinkConfig in the higher-layer parameter dmrs-DownlinkForPDSCHMappingTypeB is equal to "pos1".

Preferably, in the case where the user equipment is not configured with the additional PDSCH DM-RS, the reference processing capability assumption includes one or a plurality of the following: dmrs-AdditionalPosition in DMRS-DownlinkConfig in a higher-layer parameter dmrs-DownlinkForPDSCH-MappingTypeA is configured as pos0; or dmrs-AdditionalPosition in DMRS-DownlinkConfig in the higher-layer parameter dmrs-DownlinkForPDSCH-MappingTypeB is configured as pos0.

Preferably, the reference processing capability assumption includes at least one of the following: the PDSCH is scheduled by downlink control information (DCI) format 1_0; the PDSCH is scheduled by a DCI format 1_1; the user equipment is configured with PDSCH mapping type A; a DMRS of the PDSCH is configured as a single-symbol DM-RS; a duration $l_d$ in units of a number of symbols between a first OFDM symbol of a slot where the PDSCH is located and a last OFDM symbol of the PDSCH is equal to 13; the duration $l_d$ is equal to 14; the position $l_1$ of a second DM-RS symbol of the PDSCH is equal to 12; and a PDSCH decoding time $N_{1,0}=14$ when the minimum SCS is 15 kHz and the PDSCH DM-RS is configured.

Additionally, according to the present invention, proposed is a UE for wireless communication, the UE comprises: a processor; and a memory, storing instructions, wherein the processor is configured to execute the instructions to: receive a timing advance command in uplink slot n; and determine, according to a time when the timing advance command is received, a time for applying an uplink transmission timing adjustment starting from a start of uplink slot n+k+1, wherein: k is determined according to a duration of $N_1$ symbols; n, k, and $N_1$ are all integers; and a value of $N_1$ corresponds to at least one of the following: a physical downlink shared channel (PDSCH) decoding time defined by PDSCH processing capability 1 when a reference processing capability assumption is true; a PDSCH decoding time defined by the PDSCH processing capability 1 when a PDSCH DM-RS is configured, the PDSCH decoding time is determined based on a minimum SCS among SCSs of all configured UL BWPs for all uplink carriers in a TAG and of all configured DL BWPs for corresponding downlink carriers, and $N_1$ is 14 when the minimum SCS is 15 kHz.

EFFECT OF THE INVENTION

According to the present invention, by improving the definition of a reference processing capability assumption when PDSCH processing capability 1 is determined, UE and a base station can unambiguously determine consistent duration corresponding to PDSCH processing capability 1, so that the UE can adjust uplink transmission timing in a timely manner, accurately determine a time to retransmit a random access preamble, accurately determine a time of a PUSCH scheduled by an RAR uplink grant, or accurately determine a transmission time of an HARQ-ACK for a PDSCH including a UE contention resolution identity.

BRIEF DESCRIPTION OF THE DRAWINGS

The above and other features of the present invention will become more apparent from the following detailed description taken in conjunction with the accompanying drawings, in which.

DETAILED DESCRIPTION

Figure 1:
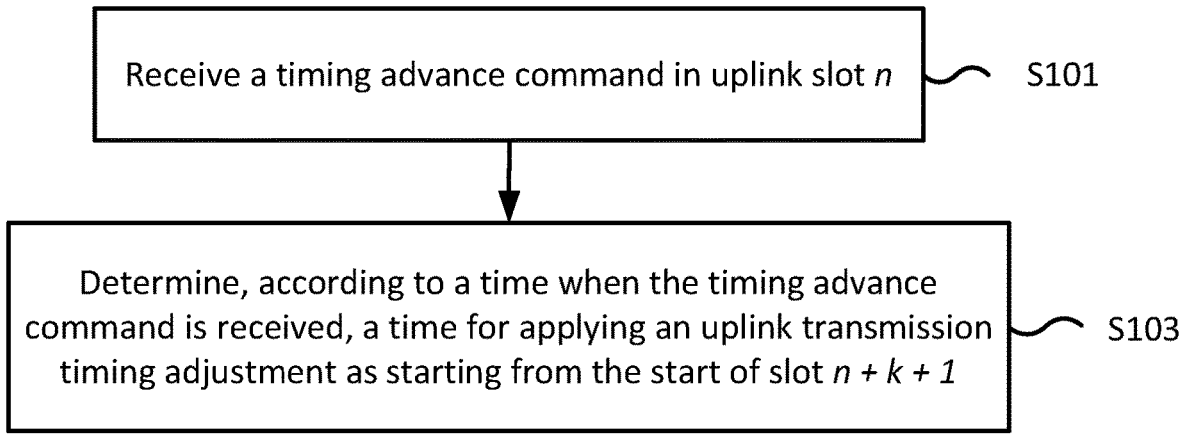
FIG. 1 is a flowchart of a method performed by user equipment according to Embodiment 1 of the present invention.

The present invention will be described in detail below with reference to the accompanying drawings and specific embodiments. It should be noted that the present invention should not be limited to the specific embodiments described below. In addition, for the sake of brevity, detailed descriptions of well-known technologies that are not directly associated with the present invention are omitted to prevent confusion in the understanding of the present invention.

A plurality of implementations according to the present invention are specifically described below by using a 5G mobile communication system and its subsequent evolved versions as an exemplary application environment. However, it is to be noted that the present invention is not limited to the following implementations, but is applicable to additional wireless communication systems, such as a communication system later than 5G and a 4G mobile communication system earlier than 5G.

Some terms involved in the present invention are described below. If not specifically indicated, the terms involved in the present invention take the definitions herein. The terms given in the present invention may be named differently in LTE, LTE-Advanced, LTE-Advanced Pro, NR, and later communication systems, but unified terms are used in the present invention. When applied to a specific system, the terms may be replaced with terms used in the corresponding system.

3GPP: 3rd Generation Partnership Project
BWP: Bandwidth Part
CA: Carrier Aggregation
CP: Cyclic Prefix
CP-OFDM: Cyclic Prefix Orthogonal Frequency Division Multiplexing
C-RNTI: Cell RNTI, Cell Radio Network Temporary Identifier
DC: Dual Connectivity
DFT-s-OFDM: Discrete Fourier Transformation Spread Orthogonal Frequency Division Multiplexing
DL: Downlink
DL-SCH: Downlink Shared Channel
DM-RS: Demodulation reference signal
eMBB: Enhanced Mobile Broadband, Enhanced Mobile Broadband Communications
HARQ: Hybrid Automatic Repeat Request
HARQ-ACK: HARQ Acknowledgement, Hybrid Automatic Repeat Request Acknowledgement
IE: Information Element
LCID: Logical Channel ID, Logical Channel Identity
LTE-A: Long Term Evolution-Advanced
MAC: Medium Access Control
MAC CE: MAC Control Element
MCG: Master Cell Group
mMTC: massive Machine Type Communication
NR: New Radio
NUL: Normal Uplink
OFDM: Orthogonal Frequency Division Multiplexing
PBCH: Physical Broadcast Channel
PDSCH: Physical Downlink Shared Channel
PRACH: Physical Random Access Channel
PSBCH: Physical Sidelink Broadcast Channel
PSCCH: Physical Sidelink Control Channel
PSFCH: Physical Sidelink Feedback Channel
PSSCH: Physical Sidelink Shared Channel
PSS: Primary Synchronization Signal
PSSS: Primary Sidelink Synchronization Signal
PTAG: Primary Timing Advance Group
PUSCH: Physical Uplink Shared Channel
RAR: Random Access Response
RB: Resource Block
RE: Resource Element
RNTI: Radio Network Temporary Identifier
RRC: Radio Resource Control
SCG: Secondary Cell Group
SCI: Sidelink Control Information
SCS: Subcarrier Spacing
SFN: System Frame Number
SIB: System Information Block
SL: Sidelink
SL BWP: Sidelink Bandwidth Part
SL PSS: Sidelink Primary Synchronization Signal
SL SSB: Sidelink SS/PBCH Block, Sidelink Synchronization Signal/Physical Broadcast Channel Block
SL SSS: Sidelink Secondary Synchronization Signal
SpCell: Special Cell
SSB: SS/PBCH Block, Synchronization Signal/Physical Broadcast Channel Block
SSS: Secondary Synchronization Signal SSSS: Secondary Sidelink Synchronization Signal
STAG: Secondary Timing Advance Group
SUL: Supplementary Uplink
TA: Timing Advance
TAG: Timing Advanced Group
TC-RNTI: Temporary C-RNTI, Temporary Cell Radio Network Temporary Identifier
TDD: Time Division Duplexing
UE: User Equipment
UL: Uplink
URLLC: Ultra-Reliable and Low Latency Communication
V2I: Vehicle-to-Infrastructure
V2N: Vehicle-to-Network
V2P: Vehicle-to-Pedestrian
V2V: Vehicle-to-Vehicle
V2X: Vehicle-to-Everything Unless otherwise specified, in all the embodiments and implementations of the present invention: an initial active UL BWP may also be referred to as an initial UL BWP, and may be, for example, configured through a higher-layer parameter initialuplinkBWP; an initial active DL BWP may also be referred to as an initial DL BWP, and may be, for example, configured through a higher-layer parameter initialDownlinkBWP; μ represents a subcarrier spacing configuration. μ=0, 1, 2, 3, and 4 correspond to SCS=15 kHz, 30 kHz, 60 kHz, 120 kHz, and 240 kHz, respectively.

Embodiment 1

A method performed by user equipment according to Embodiment 1 of the present invention will be described below with reference to FIG. 1.

FIG. 1 is a flowchart of a method performed by user equipment according to Embodiment 1 of the present invention.

As shown in FIG. 1, in Embodiment 1 of the present invention, steps performed by the user equipment (UE) include: step S101 and step S103.

Specifically, in step S101, a timing advance command is received in an uplink slot n. The uplink slot a may be the last slot of uplink slots that overlaps with one or a plurality of slots for performing PDSCH reception. The PDSCH may be a PDSCH that provides the timing advance command. When the uplink slot a is determined, it can be assumed that $T_{TA}=0$, where $T_{TA}$ is the value of an uplink transmission timing adjustment in units of seconds. When the uplink slot a is determined, an SCS used may be the minimum value of SCSs used by all uplink BWPs configured in all uplink carriers configured in a TAG indicated by the timing advance command.

In addition, in step S103, a time for applying the uplink transmission timing adjustment is determined as starting from a start of slot n+k+1 according to a time when the timing advance command is received and/or other information related to the uplink transmission timing adjustment.

$$k=[N_{slot}^{subframe,\mu} \cdot (N_{T,1}+N_{T,2}+N_{TA,max}+0.5)/T_{sf}].$$

$N_{T,1}$ represents the duration of $N_1$ symbols (in units of milliseconds), $N_{T,2}$ represents the duration of $N_2$ symbols (in units of milliseconds), where $N_2$ may correspond to a PUSCH preparation time corresponding to PUSCH timing capability 1. Sometimes, when the context is clear, for example, it can be seen from the context that a capability related to PUSCH timing is indicated, PUSCH timing capability 1 may also be referred to as UE processing capability 1. $N_{TA,max}$ refers to the maximum timing advance value (in milliseconds) SCS used in determination of $N_1$ and $N_2$, may be the smallest SCS in the following: an SCS used by all uplink BWPs configured in all uplink carriers configured in a TAG indicated by the timing advance command; and an SCS used by all downlink BWPs configured in downlink carriers corresponding to all the uplink carriers. The SCS used in determination of $N_1$ and $N_2$ may also be defined in other ways. The SCS used in determination of $N_{TA,max}$ may be the smallest SCS in the following: the SCS used by all BWPs configured in all uplink carriers configured in the TAG indicated by the timing advance command. All configured initial uplink BWPs. The SCS used in determination of $N_{TA,max}$ may also be defined in other ways.

Optionally, in Embodiment 1 of the present invention, "all uplink BWPs" configured in a given uplink carrier may or may not include an initial active uplink BWP.

Optionally, in Embodiment 1 of the present invention, "all downlink BWPs" configured in a given downlink carrier may include or may not include an initial active downlink BWP.

In Embodiment 1, $N_1$ may correspond to a PDSCH decoding time (which may also be referred to as a PDSCH processing time) defined by PDSCH processing capability 1 when a reference processing capability assumption holds true, or may correspond to the maximum PDSCH decoding time defined by the PDSCH processing capability 1, or may correspond to the maximum PDSCH decoding time defined by the PDSCH processing capability 1 when an additional PDSCH DM-RS is configured, or may correspond to the minimum PDSCH decoding time defined by the PDSCH processing capability 1, or may correspond to the minimum PDSCH decoding time defined by the PDSCH processing capability 1 when the additional PDSCH DM-RS is configured.

Sometimes, when the context is clear, for example, it can be seen from the context that a capability related to PDSCH processing is indicated, PDSCH processing capability 1 may also be referred to as UE processing capability 1.

Sometimes, when the context is clear, the PDSCH decoding time may also be referred to as a PDSCH reception time.

The PDSCH decoding time may be a PDSCH decoding time corresponding to a determined SCS (for example, 15 kHz, for another example, 30 kHz, for another example, 60 kHz, for another example, 120 kHz).

The PDSCH decoding time may also be a PDSCH decoding time corresponding to all SCSs. For example, the "the maximum PDSCH decoding time defined by the PDSCH processing capability 1 when the additional PDSCH DM-RS is configured" may be the greatest value among the PDSCH decoding time defined by the PDSCH processing capability 1 for all the SCSs when the additional PDSCH DM-RS is configured.

The reference processing capability assumption may be one or a plurality of the following (a)-(r) (any combination of "and" or "or" when applicable):

(a) The UE is configured with the additional PDSCH DM-RS, for example, one or a plurality of the following (in any combination of "and" or "or" when applicable): a higher-layer parameter dmrs-DownlinkForPDSCHMappingTypeA is not configured; DMRS-DownlinkConfig in the higher-layer parameter dmrs-DownlinkForPDSCHMappingTypeA is not configured; dmrs-AdditionalPosition in DMRS-DownlinkConfig in the higher-layer parameter dmrs-DownlinkForPDSCHMappingTypeA is not configured; a configured value of dmrs-AdditionalPosition in DMRS-DownlinkConfig in the higher-layer parameter dmrs-DownlinkForPDSCHMappingTypeA is not "pos0";

the configured value of dmrs-AdditionalPosition in DMRS-DownlinkConfig in the higher-layer parameter dmrs-DownlinkForPDSCHMappingTypeA is equal to "pos1"; the configured value of dmrs-AdditionalPosition in DMRS-DownlinkConfig in the higher-layer parameter dmrs-DownlinkForPDSCHMappingTypeA is equal to "pos2"; the configured value of dmrs-AdditionalPosition in DMRS-DownlinkConfig in the higher-layer parameter dmrs-DownlinkForPDSCHMappingTypeA is equal to "pos3"; a higher-layer parameter dmrs-DownlinkForPDSCHMappingTypeB is not configured; DMRS-DownlinkConfig in the higher-layer parameter dmrs-DownlinkForPDSCHMappingTypeB is not configured; dmrs-AdditionalPosition in DMRS-DownlinkConfig in the higher-layer parameter dmrs-DownlinkForPDSCHMappingTypeB is not configured; a configured value of dmrs-AdditionalPosition in DMRS-DownlinkConfig in the higher-layer parameter dmrs-DownlinkForPDSCHMappingTypeB is not "pos0"; the configured value of dmrs-AdditionalPosition in DMRS-DownlinkConfig in the higher-layer parameter dmrs-DownlinkForPDSCHMappingTypeB is equal to "pos1"; the configured value of dmrs-AdditionalPosition in DMRS-DownlinkConfig in the higher-layer parameter dmrs-DownlinkForPDSCHMappingTypeB is equal to "pos2"; or the configured value of dmrs-AdditionalPosition in DMRS-DownlinkConfig in the higher-layer parameter dmrs-DownlinkForPDSCHMappingTypeB is equal to "pos3".

(b) The UE is not configured with the additional PDSCH DM-RS, for example, one or a plurality of the following (in any combination of "and" or "or" when applicable): dmrs-AdditionalPosition in DMRS-DownlinkConfig in the higher-layer parameter dmrs-DownlinkForPDSCH-MappingTypeA is configured as pos0; dmrs-AdditionalPosition in DMRS-DownlinkConfig in the higher-layer parameter dmrs-DownlinkForPDSCH-MappingTypeB is configured as pos0;

(c) the PDSCH is scheduled by the DCI format 1_0;
(d) the PDSCH is scheduled by a DCI format 1_1;
(e) the UE is configured with PDSCH mapping type A;
(f) the UE is configured with PDSCH mapping type B;
(g) the DMRS of the PDSCH is configured as a single-symbol DM-RS;
(h) the DMRS of the PDSCH is configured as a double-symbol DM-RS;
(i) the duration $l_d$ (in units of the number of symbols) between the first OFDM symbol of the slot where the PDSCH is located and the last OFDM symbol of the PDSCH is a value less than 13;
(j) the duration $l_d$ (in units of the number of symbols) between the first OFDM symbol of the slot where the PDSCH is located and the last OFDM symbol of the PDSCH is equal to 13;
(k) the duration $l_d$ (in the number of symbols as a unit) between the first OFDM symbol of the slot where the PDSCH is located and the last OFDM symbol of the PDSCH is equal to 14;
(l) the duration $l_d$ (in the number of symbols as a unit) between the first OFDM symbol of the PDSCH and the last OFDM symbol of the PDSCH is a value less than 13;
(m) the duration $l_d$ (in units of the number of symbols) between the first OFDM symbol of the PDSCH and the last OFDM symbol of the PDSCH is equal to 13;
(n) the duration $l_d$ (in the number of symbols as a unit) between the first OFDM symbol of the PDSCH and the last OFDM symbol of the PDSCH is equal to 14;
(o) the position $l_1$ of the second DM-RS symbol of the PDSCH is equal to 11;
(p) the position $l_1$ of the second DM-RS symbol of the PDSCH is equal to 12;
(q) a PDSCH decoding time $N_{1,0}=13$ when $\mu=0$ and the UE is configured with the additional PDSCH DM-RS; or
(r) the PDSCH decoding time $N_{1,0}=14$ when $\mu=0$ and the UE is configured with the additional PDSCH DM-RS.

In this way, according to Embodiment 1, the present invention provides a method, wherein by improving the definition of a reference processing capability assumption when PDSCH processing capability 1 is determined, UE and a base station can unambiguously determine consistent duration corresponding to PDSCH processing capability 1, so that the UE can adjust uplink transmission timing in a timely manner, and ensures that an uplink transmission timing error of the UE is maintained within an appropriate range.

Embodiment 2

A method performed by user equipment according to Embodiment 2 of the present invention will be described below with reference to FIG. 2.

Figure 2:
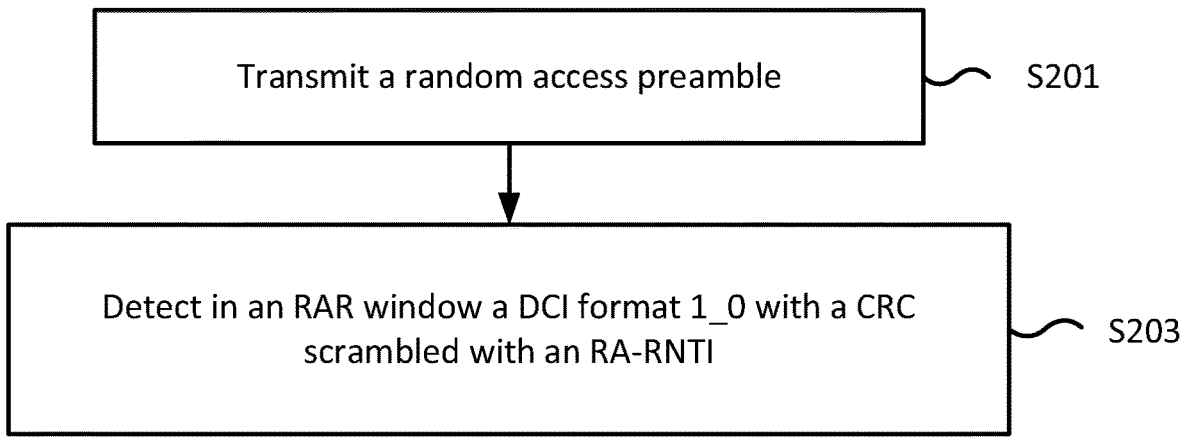
FIG. 2 is a flowchart of a method performed by user equipment according to Embodiment 2 of the present invention.

FIG. 2 is a flowchart of a method performed by user equipment according to Embodiment 2 of the present invention.

As shown in FIG. 2, in Embodiment 2 of the present invention, steps performed by the user equipment (UE) include: step S201 and step S203.

Specifically, in step S201, a random access preamble is transmitted (sometimes also referred to as transmitting a physical random access channel (PRACH)). The transmission of the random access preamble may be triggered by a higher layer, or may be triggered by a PDCCH order, or may be triggered in other ways.

In addition, in step S203, a DCI format 1_0 with a CRC scrambled with an RA-RNTI is detected in a random access response (RAR) window.

Optionally, if the UE detects the DCI format 1_0 and a corresponding PDSCH (i.e., the PDSCH scheduled by the DCI format 1_0) in the RAR window, and the higher layer of the UE identifies a random access preamble identity (RAPID) carried in a transport block carried in the PDSCH, for example, if the RAPID is consistent with an index of the random access preamble transmitted by the UE in step S201, the higher layer of the UE indicates to a physical layer an RAR uplink grant (UL grant) carried in the transport block.

Optionally, if the UE does not detect in the RAR window the DCI format 1_0 with a CRC scrambled with the RA-RNTI, or does not correctly receive a transport block in the corresponding PDSCH (i.e., the PDSCH scheduled by the DCI format 1_0) in the RAR window, or does not identify the RAPID (for example, the RAPID is inconsistent with the index of the random access preamble transmitted by the UE in step S201), then the higher layer of the UE may instruct the physical layer to transmit (or retransmit) the random access preamble. In this case, a time when the UE transmits the random access preamble should be no later than $N_{T,1}$+ 0.75 milliseconds after the last symbol of the RAR window or $N_{T,1}$+0.75 milliseconds after the last symbol of the PDSCH reception. $N_{T,1}$ represents the duration of $N_1$ symbols (in units of milliseconds).

In Embodiment 2, a method for determining the value of $N_1$ is the same as that in Embodiment 1 described above, and therefore a detailed description thereof is omitted.

In this way, according to the description of Embodiment 2, the present invention provides a method, wherein by improving the definition of a reference processing capability assumption when PDSCH processing capability 1 is determined, UE and a base station can unambiguously determine the consistent duration corresponding to the PDSCH processing capability 1, so that the UE can accurately determine a time to retransmit a random access preamble, and ensures correct completion of a random access procedure.

Embodiment 3

A method performed by user equipment according to Embodiment 3 of the present invention will be described below with reference to FIG. 3.

Figure 3:
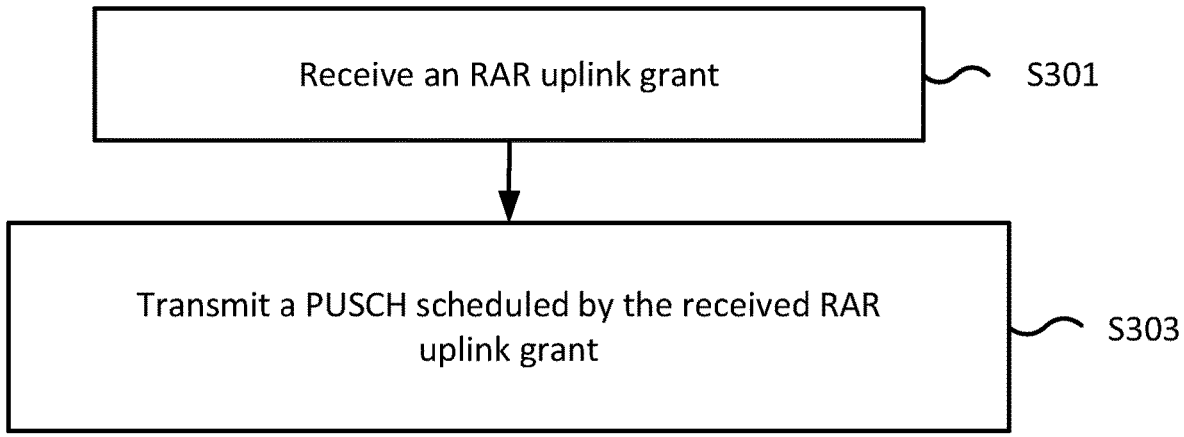
FIG. 3 is a flowchart of a method performed by user equipment according to Embodiment 3 of the present invention.

FIG. 3 is a flowchart of a method performed by user equipment according to Embodiment 3 of the present invention.

As shown in FIG. 3, in Embodiment 3 of the present invention, steps performed by the user equipment (UE) include: step S301 and step S303.

Specifically, in step S301, an RAR uplink grant is received. The RAR uplink grant may be included in a MAC RAR, the MAC RAR may be included in a MAC PDU, and the MAC PDU may be carried by a PDSCH. In addition, sometimes, when the context is clear, it may also be considered that the PDSCH carries a "RAR message", and the RAR message includes the RAR uplink grant.

In addition, in step S303, the PUSCH scheduled by the received RAR uplink grant is transmitted. The UE may assume that the minimum time between the last symbol of the PDSCH reception and the first symbol of the PUSCH transmission is equal to $N_{T,1}+N_{T,2}+0.75$. $N_{T,1}$ represents the duration of $N_1$ symbols (in units of milliseconds). $N_{T,2}$ represents the duration of $N_2$ symbols (in units of milliseconds), where $N_2$ corresponds to a PUSCH preparation time corresponding to the PUSCH timing capability 1. Sometimes, when the context is clear, for example, it can be seen from the context that a capability related to PUSCH timing is indicated, PUSCH timing capability 1 may also be referred to as UE processing capability 1. The SCS used in determination of $N_1$ and $N_2$ may be the smaller of SCSs configured by the PDSCH and the PUSCH, or may be an SCS determined in other ways.

In Embodiment 3, a method for determining the value of $N_1$ is the same as that in Embodiment 1 described above, and therefore a detailed description thereof is omitted.

In this way, according to the description of Embodiment 3, the present invention provides a method, wherein by improving the definition of a reference processing capability assumption when PDSCH processing capability 1 is determined, UE and a base station can unambiguously determine the consistent duration corresponding to the PDSCH processing capability 1, so that the UE can accurately determine a time of a PUSCH scheduled by an RAR uplink grant, and ensures correct completion of a random access procedure.

Embodiment 4

A method performed by user equipment according to Embodiment 4 of the present invention will be described below with reference to FIG. 4.

Figure 4:
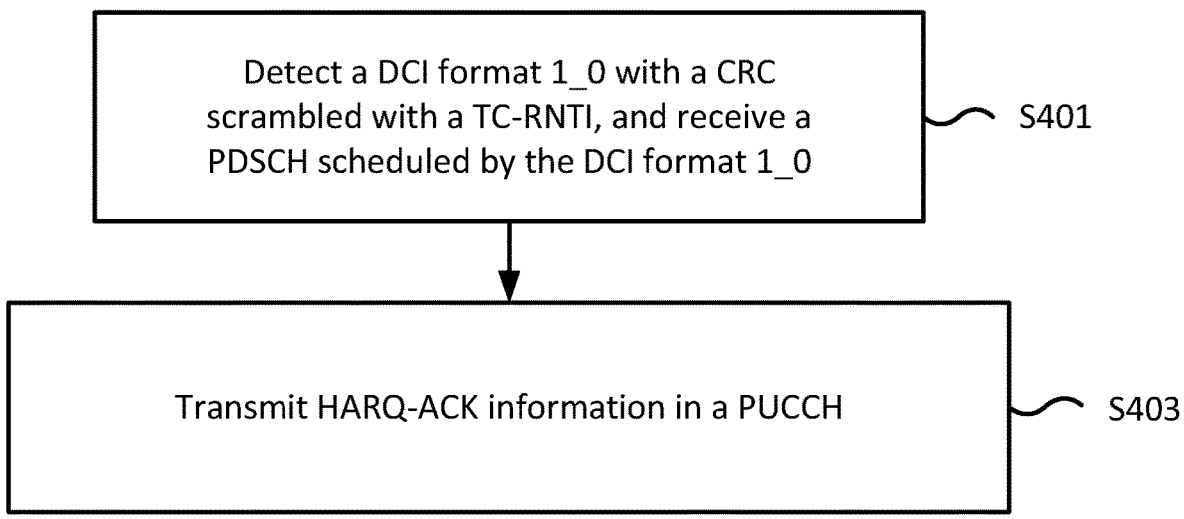
FIG. 4 is a flowchart of a method performed by user equipment according to Embodiment 4 of the present invention.

FIG. 4 is a flowchart of a method performed by user equipment according to Embodiment 4 of the present invention.

As shown in FIG. 4, in Embodiment 4 of the present invention, steps performed by the user equipment (UE) include: step S401 and step S403.

Specifically, in step S401, a DCI format 1_0 with a CRC scrambled with a TC-RNTI (temporary C-RNTI, temporary cell radio network temporary identifier) is detected, and a PDSCH scheduled by the DCI format 1_0 is received. Optionally, the PDSCH may include a UE contention resolution identity. Optionally, the PDSCH may be used to respond to PUSCH transmission scheduled by a RAR uplink grant.

In addition, in step S403, HARQ-ACK information is transmitted in the PUCCH. Optionally, the HARQ-ACK information may be used to respond to the PDSCH. Optionally, the PUCCH and the PUSCH may be in the same active uplink BWP. The minimum time between the last symbol of the PDSCH reception and the first symbol of the PUCCH transmission is equal to $N_{T,1}+0.5$ milliseconds. $N_{T,1}$ represents the duration of $N_1$ symbols (in units of milliseconds).

Optionally, Embodiment 4 of the present invention is performed only when the UE is not provided with a C-RNTI.

Optionally, Embodiment 4 of the present invention is performed only when the UE is not in an RRC_CONNECTED mode.

In Embodiment 4, a method for determining the value of $N_1$ is the same as that in Embodiment 1 described above, and therefore a detailed description thereof is omitted.

In this way, according to the description of Embodiment 4, the present invention provides a method, wherein by improving the definition of a reference processing capability assumption when PDSCH processing capability 1 is determined, UE and a base station can unambiguously determine the consistent duration corresponding to the PDSCH processing capability 1, so that the UE can accurately determine a transmission time of an HARQ-ACK for a PDSCH including a UE contention resolution identity, and ensures correct completion of a random access procedure.

Embodiment 5

A method performed by user equipment according to Embodiment 5 of the present invention will be described below with reference to FIG. 5.

Figure 5:
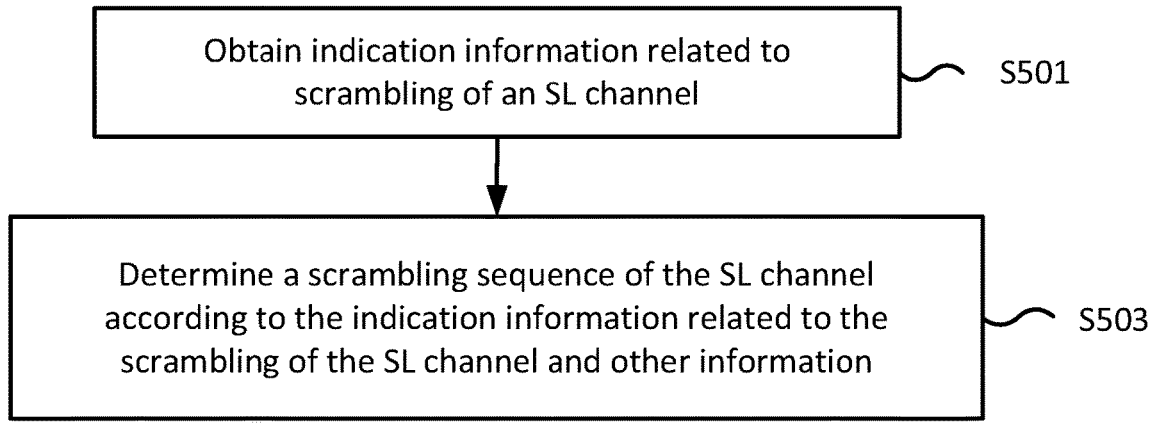
FIG. 5 is a flowchart of a method performed by user equipment according to Embodiment 5 of the present invention.

FIG. 5 is a flowchart of a method performed by user equipment according to Embodiment 5 of the present invention.

As shown in FIG. 5, in Embodiment 5 of the present invention, steps performed by the user equipment (UE) include: step S501 and step S503.

Specifically, in step S501, indication information related to scrambling of an SL channel is obtained.

Optionally, the indication information related to the scrambling of the SL channel may be from predefined information, or may be from pre-configuration information of the UE, or may be from default configuration information of the UE, or may be from a base station (for example, a gNB, for another example, an eNB), or may be from other UE, or may be a combination of the above methods.

Optionally, the indication information related to the scrambling of the SL channel may be included in an RRC message or a PC5 RRC message (for example, an MIB, for another example, an SIB, for another example, an SL MIB, for another example, pre-configuration information, for another example, default configuration information, for another example, other RRC messages, for another example, other PC5 RRC messages), or may be included in a MAC CE, or may be included in downlink control information (DCI), or may be included in sidelink control information (SCI), or may be a combination of the above methods.

Optionally, the indication information related to the scrambling of the SL channel may be indicated through a protocol layer of the UE (for example, an RRC layer, for another example, a NAS layer, for another example, a V2X layer, for another example, an application layer, for another example, a physical layer, for another example, a MAC sublayer, for another example, an RLC sublayer, for another example, a PDCP sublayer, for another example, an SDAP sublayer, for another example, other protocol layers, when applicable) to another protocol layer (for example, an RRC layer, for another example, a NAS Layer, for another example, a V2X layer, for another example, an application layer, for another example, a physical layer, for another example, a MAC sublayer, for another example, an RLC sublayer, for another example, a PDCP sublayer, for another example, an SDAP sublayer, for another example, other protocol layers, when applicable).

The SL channel may be a channel related to SL synchronization, or may be a channel related to SL communication, or may be other channels transmitted on an SL carrier. Specifically, the channel may be a PSBCH, or may be a PSCCH, or may be a PSSCH, or may be a PSFCH, or may be other SL channels.

The indication information related to the scrambling of the SL channel may include one or a plurality of the following (a)-(b):

(a) UE ID (denoted as $N_{ID}^{UE}$). Optionally, the UE ID may be a physical layer UE ID (or referred to as a layer-1 UE ID), or a higher layer UE ID. Optionally, the higher layer (or upper layer) may refer to a protocol layer or protocol sublayer above the physical layer (excluding the physical layer), for example, the MAC sublayer, for another example, the RLC sublayer, for another example, the PDCP sublayer, for another example, the SDAP sublayer, for another example, the RRC layer, for another example, the NAS layer, for another example, the V2X layer, for another example, the application layer.

Optionally, the UE ID may refer to UE ID used by a specific protocol layer or protocol sublayer, or may refer to a UE ID commonly used by a plurality of protocol layers or protocol sublayers. For example, the UE ID may be a layer-2 UE ID, and the layer-2 UE ID may be used by one or a plurality of the MAC sublayer, the RLC sublayer, the PDCP sublayer, and the SDAP sublayer.

Optionally, the UE ID may be an integer, for example, a 4-bit integer, for another example, a 6-bit integer, for another example, an 8-bit integer, for another example, a 10-bit integer, for another example, a 12-bit integer, for another example, a 14-bit integer, for another example, a 16-bit integer, for another example, an 18-bit integer, for another example, a 20-bit integer, for another example, a 22-bit integer, for another example, a 24-bit integer, for another example, a 26-bit integer, for another example, a 28-bit integer, for another example, a 30-bit integer, for another example, a 32-bit integer, for another example, a 34-bit integer, for another example, a 36-bit integer, for another example, a 38-bit integer, for another example, a 40-bit integer, for another example, a 42-bit integer, for another example, a 44-bit integer, for another example, a 46-bit integer, for another example, a 48-bit integer, for another example, a 50-bit integer, for another example, a 52-bit integer, for another example, a 54-bit integer, for another example, a 56-bit integer, for another example, a 58-bit integer, for another example, a 60-bit integer, for another example, a 62-bit integer, for another example, a 64-bit integer.

Optionally, the UE ID may be a source UE ID used to identify source UE or a destination UE ID used to identify destination UE in SL transmission.

Optionally, the UE ID may be used to identify UE or a group of UE (including one or a plurality of pieces of UE). When the UE ID is used to identify a group of UE, the UE ID may also be referred to as a group ID or a UE group ID, and correspondingly, the source UE ID may be referred to as a source group ID or a source UE group ID, and the destination UE ID may be referred to as a destination group ID or a destination UE group ID.

Optionally, when the UE ID is mentioned, the UE ID may refer to an integer corresponding to a part of bits of the UE ID (such as 8 least significant bits, or 8 most significant bits, or 16 least significant bits, or 16 most significant bits), or may refer to an integer corresponding to all the bits of the UE ID.

Optionally, the UE ID may be separately configured for one or a plurality of a unicast, a groupcast, and a broadcast.

Optionally, the UE ID may be separately configured for one or a plurality of a PSBCH, a PSCCH, a PSSCH, and a PSFCH.

Optionally, the UE ID may be separately configured for different resource allocation modes used by the SL channel (for example, mode 1, i.e., a base station schedules SL resources for the SL transmission of the UE; for another example, mode 2, i.e., the UE determines SL resources for the SL transmission of the UE).

(b) SL synchronization ID (sidelink synchronization identity, denoted as $N_{ID}^{SL}$). Optionally, the SL synchronization ID may also be referred to as an SLSS ID, or an SL-SSID, or a V2X SSID. Optionally, the SL synchronization ID may be an ID carried in an SL PSS and/or an SL SSS. Optionally, a value range set of the SL synchronization ID may be $\{0, 1, \ldots, 83\}$, or may be $\{0, 1, \ldots, 167\}$, or may be $\{0, 1, \ldots, 251\}$, or may be $\{0, 1, \ldots, 335\}$, or may be $\{0, 1, \ldots, 419\}$, or may be $\{0, 1, \ldots, 503\}$, or may be $\{0, 1, \ldots, 587\}$, or may be $\{0, 1, \ldots, 671\}$, or may be $\{0, 1, \ldots, 755\}$, or may be $\{0, 1, \ldots, 839\}$, or may be $\{0, 1, \ldots, 923\}$, or may be $\{0, 1, \ldots, 1007\}$, or may be $\{0, 1, \ldots, 1091\}$, or may be another set of integers.

In addition, in step S503, a scrambling sequence of the SL channel is determined according to the indication information related to the scrambling of the SL channel and/or other information. The scrambling sequence may be a pseudo-random sequence.

For example, the pseudo-random sequence c(n) may be defined as follows:

$$c(n)=(x_1(n+N_C)+x_2(n+N_C)) \bmod 2;$$

$$x_1(n+31)=(x_1(n+3)+x_1(n)) \bmod 2;$$

$$x_2(n+31)=(x_2(n+3)+x_2(n+2)+x_2(n+1)+x_2(n)) \bmod 2,$$

where $N_C=1600$; $x_1(n)$ is initialized to $x_1(0)=1$, $x_1(n)=0$, $n=1, 2, \ldots, 30$; $x_2(n)$ is initialized to $c_{init}=\sum_{i=0}^{30} x_2(i) \cdot 2^i$. Among them, $c_{init}$ may be a function of $N_{ID}^{UE}$, or may be a function of $N_{ID}^{SL}$, or may be a function of $N_{ID}^{UE}$ and $N_{ID}^{SL}$.

For example, $c_{init}$ may be defined in any of the following ways:

$$c_{init}=N_{ID}^{UE};$$

$$c_{init}=N_{ID}^{UE}|2^M;$$

$$c_{init}=N_{ID}^{UE} \bmod 2^{31};$$

$$c_{init}=(N_{ID}^{UE} \bmod 2^{31})|2^M;$$

$$c_{init}=(N_{ID}^{UE}|2^M) \bmod 2^{31};$$

$$c_{init}=N_{ID}^{UE} \cdot 2^N+N_I^{SL};$$

$c_{init}=(N_{ID}^{UE}\cdot 2^N+N_{ID}^{SL})|2^M;$ $c_{init}=(N_{ID}^{UE}\cdot 2^N+N_{ID}^{SL})\mod 2^{31};$ $c_{init}=((N_{ID}^{UE}\cdot 2^N+N_{ID}^{SL})\mod 2^{31})\mod 2^{31})|2^M;$ $c_{init}=((N_{ID}^{UE}\cdot 2^N+N_{ID}^{SL})|2^M)\mod 2^{31};$ $c_{init}=N_{ID}^{SL}\cdot 2^N+N_{ID}^{UE};$ $c_{init}=(N_{ID}^{SL}\cdot 2^N+N_{ID}^{UE})|2^M;$ $c_{init}=(N_{ID}^{SL}\cdot 2^N+N_{ID}^{UE})\mod 2^{31};$ $c_{init}=((N_{ID}^{SL}\cdot 2^N+N_{ID}^{UE})\mod 2^{31})|2^M;$ or $c_{init}=((N_{ID}^{SL}\cdot 2^N+N_{ID}^{UE})|2^M)\mod 2^{31}.$ Among them, M may be a value in {1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31}, N may be a value in {1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31}, and "|" is a bitwise OR operator.

In this way, Embodiment 5 of the present invention uses a special scrambling ID when a scrambling sequence of a SL channel is initialized, to at least partially avoid collisions of scrambling sequences between SL channels transmitted by different UE, thereby greatly reducing possible mutual interference between the different SL channels. In addition, using a longer ID to scramble the SL channel also greatly reduces or even completely avoids the problem of inability to correctly identify source and/or destination UE ID at a physical layer due to potential collisions of short IDs (such as physical layer IDs and other problems.

Embodiment 6

A method performed by user equipment according to Embodiment 6 of the present invention will be described below with reference to FIG. 6.

Figure 6:
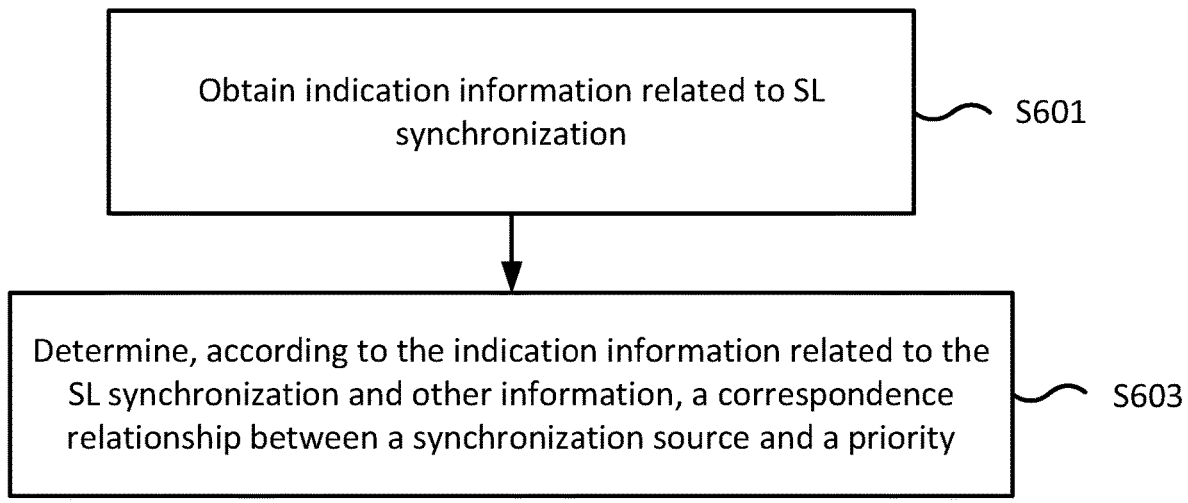
FIG. 6 is a flowchart of a method performed by user equipment according to Embodiment 6 of the present invention.

FIG. 6 is a flowchart of a method performed by user equipment according to Embodiment 6 of the present invention.

As shown in FIG. 6, in Embodiment 6 of the present invention, steps performed by the user equipment (UE) include: step S601 and step S603.

Specifically, in step S601, indication information related to SL synchronization is obtained.

Optionally, the indication information related to the SL synchronization may be from predefined information, or may be from pre-configuration information of the UE, or may be from default configuration information of the UE, or may be from a base station (for example, a gNB, for another example, an eNB), or may be from other UE, or may be a combination of the above methods.

Optionally, the indication information related to the SL synchronization may be included in an RRC message or a PC5 RRC message (for example, an MIB, for another example, an SIB, for another example, an SL MIB, for another example, pre-configuration information, for another example, default configuration information, for another example, other RRC messages, for another example, other PC5 RRC messages), or may be included in a MAC CE, or may be included in downlink control information (DCI), or may be included in sidelink control information (SCI), or may be a combination of the above methods.

Optionally, the indication information related to the SL synchronization may be indicated through a protocol layer of the UE (for example, an RRC layer, for another example, a NAS layer, for another example, a V2X layer, for another example, an application layer, for another example, a physical layer, for another example, a MAC sublayer, for another example, an RLC sublayer, for another example, a PDCP sublayer, for another example, an SDAP sublayer, for another example, other protocol layers, when applicable) to another protocol layer (for example, an RRC layer, for another example, a NAS Layer, for another example, a V2X layer, for another example, an application layer, for another example, a physical layer, for another example, a MAC sublayer, for another example, an RLC sublayer, for another example, a PDCP sublayer, for another example, an SDAP sublayer, for another example, other protocol layers, when applicable).

Optionally, the indication information related to the SL synchronization may include one or a plurality of the following (a)-(b):

(a) SL synchronization mode. Optionally, the SL synchronization mode may be classified according to a primary synchronization source (also referred to as a synchronization reference) of the SL. For example, the SL synchronization mode may include GNSS-based synchronization and gNB/eNB-based synchronization.

(b) Information of synchronization of the base station to the GNSS. Optionally, the base station may be a gNB, or may be an eNB, or may be other base stations. Optionally, the information of synchronization of the base station to the GNSS may indicate information of synchronization of one or a plurality of base stations to the GNSS. Optionally, information of synchronization of each of a plurality of base stations to the GNSS may be separately obtained from the base stations.

For example, the "information of synchronization of the base station to the GNSS" may include one or a plurality of the following (a)-(f):

(a) Whether the base station is synchronized to the GNSS. For example, the base station has been synchronized to the GNSS, or the base station has been directly synchronized to the GNSS, or the base station has been indirectly synchronized to the GNSS, or the base station has not been synchronized to the GNSS.

(b) The type of the GNSS synchronized to by the base station, for example, the Global Positioning System (GPS), for another example, the GLObal NAvigation Satellite System (GLONASS), for another example, the BeiDou (BeiDou Navigation Satellite System), for another example, the Galileo (Galileo Navigation Satellite System), for another example, the Quasi-Zenith Satellite System (QZSS). Optionally, whether the base station is synchronized to the GNSS may be implicitly determined according to the type of the GNSS synchronized to by the base station (for example, a null GNSS type indicates that the base station is not synchronized to the GNSS).

(c) Frame number offset. For example, the frame number offset may be an offset between an SFN of the base station and a direct frame number (DFN) on the SL. For another example, the frame number offset may be an offset between the DFN on the SL and the SFN of the base station.

(d) Subframe offset. For example, the subframe offset may be an offset between a subframe of the base station and a subframe on the SL. For another example, the subframe offset may be an offset between the subframe on the SL and the subframe of the base station. The subframe may be a subframe numbered within a frame, or may be a globally numbered slot (for example, subframes within all SFNs in one SFN period are numbered).

(e) Slot offset. For example, the slot offset may be an offset between a slot of the base station and a slot on the SL. For another example, the slot offset may be an offset between the slot on the SL and the slot of the base station. The slot may be a slot numbered within a subframe, or may be a slot numbered within a frame, or may be a globally numbered slot (for example, slots within all SFNs in one SFN period are numbered).

(f) Symbol offset. For example, the symbol offset may be an offset between an OFDM symbol of the base station and an OFDM symbol on the SL. For another example, the symbol offset may be an offset between the OFDM symbol on the SL and the OFDM symbol of the base station. The OFDM symbol may be an OFDM symbol numbered within a slot, or may be an OFDM symbol numbered within a subframe, or may be an OFDM symbol numbered within a frame, or may be a globally numbered OFDM symbol (for example, OFDM symbols within all SFNs in one SFN period are numbered).

In addition, in step S603, a correspondence relationship between a synchronization source and a priority is determined according to the indication information related to the SL synchronization and/or other information. For example, a synchronization source corresponding to each priority is determined. For another example, the priority corresponding to each synchronization source is determined.

Optionally, the synchronization source may be a synchronization source that is actually detected, or a synchronization source that is not detected, or both.

Optionally, each priority may include one or a plurality of synchronization sources.

Optionally, the priority may be recorded as P0, P1, P2, P3, P4, P5, P6, . . . sequentially from high to low.

Optionally, the correspondence relationship between the synchronization source and the priority may be related to the "information of synchronization of the base station to the GNSS". For example, if the "synchronization mode" indicates GNSS-based synchronization, and the "information of synchronization of the base station to the GNSS" indicates that the base station has synchronized to the GNSS, the corresponding base station may serve as a synchronization source (for example, the priority is P0, for another example, the priority is P1, for another example, the priority is P2, for another example, the priority is P3, for another example, the priority is P4, for another example, the priority is P5, for another example, the priority is P6). In this case, the priority of the base station may be equal to or less than the GNSS. In addition, the priority of the base station may be greater than those of all UE directly synchronized to the GNSS, or may be equal to those of all the UE directly synchronized to the GNSS, or may be less than those of all the UE directly synchronized to the GNSS. In addition, the priority of the base station may be greater than those of all UE indirectly synchronized to the GNSS, or may be equal to those of all the UE indirectly synchronized to the GNSS, or may be less than those of all the UE indirectly synchronized to the GNSS.

Optionally, if the "synchronization mode" indicates GNSS-based synchronization, any one of the following (a)-(m) is applied:

(a) P0 corresponds to the GNSS, P1 corresponds to all the UE directly synchronized to the GNSS, P2 corresponds to all the UE indirectly synchronized to GNSS, and P3 corresponds to any other UE.

(b) P0 corresponds to the GNSS and all gNBs/eNBs synchronized to the GNSS, P1 corresponds to all the UE directly synchronized to the GNSS, P2 corresponds to all UE indirectly synchronized to the GNSS, and P3 corresponds to any other UE.

(c) P0 corresponds to the GNSS, P1 corresponds to all the gNBs/eNBs synchronized to the GNSS and all the UE directly synchronized to the GNSS, P2 corresponds to all the UE indirectly synchronized to GNSS, and P3 corresponds to any other UE.

(d) P0 corresponds to the GNSS, P1 corresponds to all the gNBs/eNBs synchronized to the GNSS, P2 corresponds to all the UE directly synchronized to GNSS, P3 corresponds to all the UE indirectly synchronized to the GNSS, and P4 corresponds to any other UE.

(e) P0 corresponds to the GNSS, P1 corresponds to all the UE directly synchronized to the GNSS, P2 corresponds to all the gNBs/eNBs synchronized to the GNSS, P3 corresponds to all the UE indirectly synchronized to the GNSS, and P4 corresponds to any other UE.

(f) P0 corresponds to the GNSS and all the gNBs/eNBs directly synchronized to the GNSS, P1 corresponds to all the gNBs/eNBs indirectly synchronized to the GNSS and all the UE directly synchronized to the GNSS, P2 corresponds to all the UE indirectly synchronized to the GNSS, and P3 corresponds to any other UE.

(g) P0 corresponds to the GNSS, P1 corresponds to all the gNBs/eNBs directly synchronized to the GNSS and all the UE directly synchronized to the GNSS, P2 corresponds to all the gNBs/eNBs indirectly synchronized to the GNSS and all the UE indirectly synchronized to the GNSS, and P3 corresponds to any other UE.

(h) P0 corresponds to the GNSS and all the gNBs/eNBs directly synchronized to the GNSS, P1 corresponds to all the gNBs/eNBs indirectly synchronized to the GNSS, P2 corresponds to all the UE directly synchronized to the GNSS, P3 corresponds to all the UE indirectly synchronized to the GNSS, and P4 corresponds to any Other UE.

(i) P0 corresponds to the GNSS and all the gNBs/eNBs directly synchronized to the GNSS, P1 corresponds to all the UE directly synchronized to the GNSS, P2 corresponds to all the gNBs/eNBs indirectly synchronized to the GNSS, P3 corresponds to all the UE indirectly synchronized to the GNSS, and P4 corresponds to any other UE.

(j) P0 corresponds to the GNSS, P1 corresponds to all the gNBs/eNBs directly synchronized to the GNSS, P2 corresponds to all the gNBs/eNBs indirectly synchronized to the GNSS and all the UE directly synchronized to the GNSS, P3 corresponds to all the UE indirectly synchronized to the GNSS, P4 corresponds to any other UE.

(k) P0 corresponds to the GNSS, P1 corresponds to all the gNBs/eNBs directly synchronized to the GNSS, P2 corresponds to all the gNBs/eNBs indirectly synchronized to the GNSS, P3 corresponds to all the UE directly synchronized to the GNSS, P4 corresponds to all the UE indirectly synchronized to the GNSS, and P5 corresponds to any other UE.

(l) P0 corresponds to the GNSS, P1 corresponds to all the gNBs/eNBs directly synchronized to the GNSS, P2 corresponds to all the UE directly synchronized to the GNSS, P3 corresponds to all the gNBs/eNBs indirectly synchronized to the GNSS, P4 corresponds to all the UE indirectly synchronized to the GNSS, and P5 Correspond to any other UE.

(m) P0 corresponds to the GNSS, P1 corresponds to all the UE directly synchronized to the GNSS, P2 corresponds to all the gNBs/eNBs directly synchronized to the GNSS, P3 corresponds to all the gNBs/eNBs indirectly synchronized to the GNSS, P4 corresponds to all the UE indirectly synchronized to the GNSS, and P5 corresponds to any other UE.

Optionally, if the "synchronization mode" indicates gNB/eNB-based synchronization, any one of the following is applied: P0 corresponds to the gNB/eNB, P1 corresponds to all UE directly synchronized to the gNB/eNB, P2 corresponds to all UE indirectly synchronized to the gNB/eNB, P3 corresponds to the GNSS, P4 corresponds to all the UE directly synchronized to the GNSS, P5 corresponds to all the UE indirectly synchronized to the GNSS, and P6 corresponds to any other UE.

In this way, in Embodiment 6 of the present invention, a base station is added to a synchronization source of GNSS-based synchronization when the base station is synchronized to the GNSS, greatly promoting the probability that the UE selects a high-priority synchronization source in this type of synchronization, and improving the performance of SL synchronization in NR V2X.

[Modifications]

User equipment that can perform the method performed by user equipment described in detail above in the present invention is illustrated below as a modified example with reference to FIG. 7.

Figure 7:
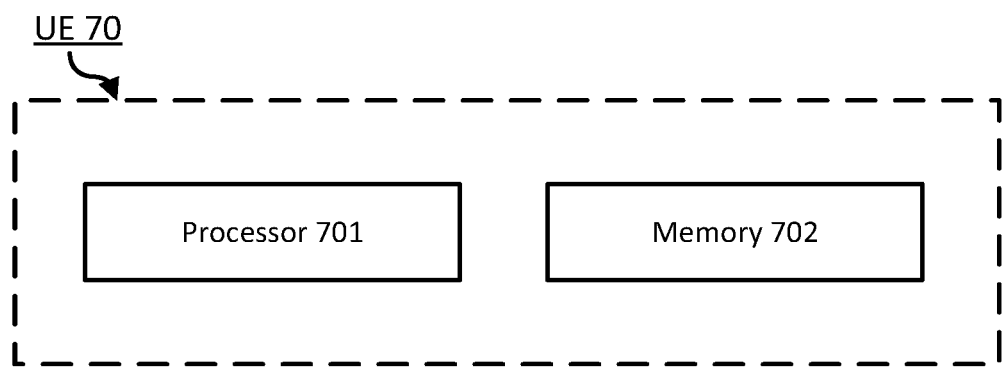
FIG. 7 is a block diagram schematically showing user equipment according to the present invention.

FIG. 7 is a block diagram illustrating user equipment (UE) according to the present invention.

As shown in FIG. 7, the user equipment (UE) 70 includes a processor 701 and a memory 702. The processor 701 may include, for example, a microprocessor, a microcontroller, an embedded processor, etc. The memory 702 may include, for example, a volatile memory (such as a random access memory (RAM)), a hard disk drive (HDD), a non-volatile memory (such as a flash memory), or other memories. The memory 702 stores program instructions. When run by the processor 701, the instructions can perform the above method performed by user equipment described in detail in the present invention.

The method and related device of the present invention have been disclosed above in conjunction with preferred embodiments. Those skilled in the art can understand that the methods shown above are only exemplary, and the various embodiments described above can be combined with each other in the case without contradiction. The method of the present invention is not limited to the steps and sequence shown above. The network nodes and user equipment shown above may include more modules, for example, may further include modules that can be developed or developed in the future and can be used for base stations, Mobility Management Entities (MMEs), or UE, and the like. The various identifiers shown above are only exemplary rather than restrictive, and the present invention is not limited to specific information elements as examples of these identifiers. Those skilled in the art can make many changes and modifications based on the teaching of the illustrated embodiments.

It should be understood that the above embodiments of the present invention can be implemented by software, hardware, or a combination of both software and hardware. For example, the various components inside the base station and user equipment in the above embodiments can be implemented using a variety of devices, including but not limited to, analog circuit devices, digital circuit devices, digital signal processing (DSP) circuits, programmable processor, application specific integrated circuits (ASICs), field programmable gate arrays (FPGAs), programmable logic devices (CPLD), etc.

In the present application, the "base station" may refer to a mobile communication data and control exchange center with large transmission power and a wide coverage area, including functions such as resource allocation and scheduling and data reception and transmission. The "user equipment" may refer to a user mobile terminal, for example, including a mobile phone, a notebook, and other terminal devices that can wirelessly communicate with a base station or a micro base station.

In addition, the embodiments of the present invention disclosed herein can be implemented on a computer program product. More specifically, the computer program product is a product that has a computer-readable medium with computer program logic encoded on the computer-readable medium, which, when run on a computing device, provides related operations to implement the above technical solution of the present invention. When run on at least one processor of a computing system, the computer program logic causes the processor to perform the operations (methods) described in the embodiments of the present invention. This arrangement of the present invention is typically provided as software, code, and/or other data structures arranged or encoded on a computer-readable medium such as an optical medium (e.g., CD-ROM), a floppy disk, or a hard disk, or other medium such as firmware or microcode on one or a plurality of ROM or RAM or PROM chips, or downloadable software images, shared databases, etc., in one or a plurality of modules. The software or firmware or such a configuration may be installed on a computing device, so that one or a plurality of processors in the computing device perform the technical solutions described in the embodiments of the present invention.

In addition, each functional module or each feature of the base station device and terminal device used in each of the above embodiments can be implemented or executed by a circuit, which is usually one or a plurality of integrated circuits. Circuits designed to execute each function described in this specification may include a general-purpose processor, a digital signal processor (DSP), an application-specific integrated circuit (ASIC) or general-purpose integrated circuit, a field programmable gate array (FPGA), or another programmable logic device, discrete gate or transistor logic, a discrete hardware component, or any combination of the above devices. The general-purpose processor may be a microprocessor, or the processor may be existing processor, controller, microcontroller, or state machine. The general-purpose processor or each circuit described above may be configured by a digital circuit, or may be configured by a logic circuit. In addition, when advanced technology that can replace the current integrated circuit appears with the progress of semiconductor technology, the present invention can also utilize an integrated circuit obtained by using the advanced technology.

Although the present invention has been disclosed above in conjunction with the preferred embodiments of the present invention, those skilled in the art will understand that various modifications, substitutions, and changes can be made to the present invention without departing from the spirit and scope of the present invention. Therefore, the present invention shall not be limited by the above embodiments, but shall be defined by the appended claims and equivalents thereof.

The invention claimed is:

1. A method performed by a user equipment for wireless communication, the method comprising:
receiving a timing advance command in an uplink slot n; and determining, according to a time when the timing advance command is received, a time for applying an uplink transmission timing adjustment starting from a start of an uplink slot n+k+1, wherein:

k is determined according to a duration of $N_1$ symbols, n, k, and $N_1$ are all integers, and a value of $N_1$ corresponds to at least one of the following:

a physical downlink shared channel (PDSCH) decoding time defined by PDSCH processing capability 1 in response to determining that a reference processing capability assumption is true, and a PDSCH decoding time defined by the PDSCH processing capability 1 in response to determining that a PDSCH demodulation reference signal (DM-RS) is configured, wherein:

the PDSCH decoding time is determined based on a minimum subcarrier spacing (SCS) among SCSs of all configured uplink bandwidth parts (BWPs) for all uplink carriers in a timing advance group and SCSs of all configured downlink BWPs for corresponding downlink carriers, and $N_1$ is 14 in response to determining that the minimum SCS is 15 kHz.

2. The method according to claim 1, wherein the uplink slot n is a last slot of uplink slots that overlap with one or more slots for performing PDSCH reception.

3. The method according to claim 1, wherein, in response to the PDSCH DM-RS being configured, the reference processing capability assumption comprises at least one of the following:

a configured value of a dmrs-AdditionalPosition in a DMRS-DownlinkConfig in a higher-layer parameter dmrs-DownlinkForPDSCHMappingTypeA that is equal to "pos1"; and a configured value of the dmrs-AdditionalPosition in the DMRS-DownlinkConfig in a higher-layer parameter dmrs-DownlinkForPDSCHMappingTypeB that is equal to the "pos1".

4. The method according to claim 1, wherein the reference processing capability assumption comprises at least one of the following:

a PDSCH that is scheduled by a downlink control information (DCI) format 1_0;

the PDSCH that is scheduled by a DCI format 1_1;

the user equipment that is configured with a PDSCH mapping type A;

a demodulation reference signal (DMRS) of the PDSCH that is configured as a single-symbol DM-RS;

a duration $l_d$ in units of a number of symbols between a first orthogonal frequency division multiplexing (OFDM) symbol of a slot where the PDSCH is located and a last OFDM symbol of the PDSCH that is equal to 13;

the duration $l_d$ that is equal to 14;

a position $l_1$ of a second DM-RS symbol of the PDSCH that is equal to 12; and a PDSCH decoding time $N_{1,0}$ that is equal to 14 in response to determining that the minimum SCS is 15 kHz and the PDSCH DM-RS is configured.

5. A method performed by a user equipment (UE) for wireless communication, the method comprising:

transmitting a random access preamble; and instructing, by a higher layer of the UE, a physical layer to retransmit the random access preamble in response to the UE not detecting, in a random access response (RAR) window, a downlink control information (DCI) format 1_0 with a cyclic redundancy check (CRC) scrambled with a random access radio network temporary identifier (RA-RNTI), or in response to the UE not correctly receiving, in the RAR window, a transport block in a physical downlink shared channel (PDSCH) scheduled by the DCI format 1_0, or in response to the UE not identifying a random access preamble identity (RAPID), wherein:

a time for the UE to retransmit the random access preamble is not later than a first time after a last symbol of the RAR window or a first time after a last symbol of a PDSCH reception, the first time is determined according to a duration of $N_1$ symbols, $N_1$ is an integer, and a value of $N_1$ corresponds to at least one of the following:

a physical downlink shared channel (PDSCH) decoding time defined by PDSCH processing capability 1 in response to determining that a reference processing capability assumption is true, and a PDSCH decoding time defined by the PDSCH processing capability 1 in response to determining that a PDSCH demodulation reference signal (DM-RS) is configured, wherein:

the PDSCH decoding time is determined based on a minimum subcarrier spacing (SCS) among a SCS of a physical downlink control channel (PDCCH) carrying the DCI format 1_0, an SCS of a corresponding PDSCH in response to determining that the PDSCH DM-RS is configured, and an SCS of the random access preamble, and $N_1$ is 14 in response to determining that the minimum SCS is 15 kHz.

6. The method according to claim 5, wherein, in response to determining that the PDSCH DM-RS is configured, the reference processing capability assumption comprises at least one of the following:

a configured value of a dmrs-AdditionalPosition in a DMRS-DownlinkConfig in a higher-layer parameter dmrs-DownlinkForPDSCHMappingTypeA is equal to "pos1"; and a configured value of the dmrs-AdditionalPosition in the DMRS-DownlinkConfig in a higher-layer parameter dmrs-DownlinkForPDSCHMappingTypeB is equal to the "pos1".

7. The method according to claim 5, wherein the reference processing capability assumption comprises at least one of the following:

the PDSCH is scheduled by a downlink control information (DCI) format 1_0;

the PDSCH is scheduled by a DCI format 1_1;

the user equipment is configured with PDSCH mapping type A;

a DM-RS of the PDSCH is configured as a single-symbol DM-RS;

a duration $l_d$ in units of a number of symbols between a first orthogonal frequency division multiplexing (OFDM) symbol of a slot where the PDSCH is located and a last OFDM symbol of the PDSCH is equal to 13;

the duration $l_d$ is equal to 14;

a position $l_1$ of a second DM-RS symbol of the PDSCH is equal to 12; and a PDSCH decoding time $N_{1,0}$ is equal to 14 in response to determining that the minimum SCS is 15 kHz and the PDSCH DM-RS is configured.

8. A method performed by a user equipment for wireless communication, the method comprising:
- receiving a random access response (RAR) uplink grant included in an RAR message on a physical downlink shared channel (PDSCH); and
- transmitting a physical uplink shared channel (PUSCH) scheduled by the received RAR uplink grant, wherein:
- a minimum time between a last symbol of the PDSCH reception and the first symbol of the PUSCH transmission is determined according to a duration of $N_1$ symbols, and
- a value of $N_1$ corresponds to at least one of the following:
- a PDSCH decoding time defined by PDSCH processing capability 1 in response to determining that a reference processing capability assumption is true, and
- a PDSCH decoding time defined by the PDSCH processing capability 1 in response to determining that a PDSCH demodulation reference signal (DM-RS) is configured, wherein:
  - the PDSCH decoding time is determined based on a minimum subcarrier spacing (SCS) among SCSs of the PDSCH and the PUSCH, and
  - $N_1$ is 14 in response to determining that the minimum SCS is 15 kHz.

9. The method according to claim 8, wherein, in response to determining that the PDSCH DM-RS is configured, the reference processing capability assumption comprises at least one of the following:
- a configured value of a dmrs-AdditionalPosition in a DMRS-DownlinkConfig in a higher-layer parameter dmrs-DownlinkForPDSCHMappingTypeA that is equal to "pos1"; and
- a configured value of the dmrs-AdditionalPosition in the DMRS-DownlinkConfig in a higher-layer parameter dmrs-DownlinkForPDSCHMappingTypeB that is equal to "pos1".

10. The method according to claim 8, wherein the reference processing capability assumption comprises at least one of the following:
- the PDSCH that is scheduled by a downlink control information (DCI) format 1_0;
- the PDSCH that is scheduled by a DCI format 1_1;
- the user equipment that is configured with a PDSCH mapping type A;
- a DM-RS of the PDSCH that is configured as a single-symbol DM-RS;
- a duration $l_d$ in units of a number of symbols between a first orthogonal frequency division multiplexing (OFDM) symbol of a slot where the PDSCH is located and a last OFDM symbol of the PDSCH that is equal to 13;
- the duration $l_d$ that is equal to 14;
- a position h of a second DM-RS symbol of the PDSCH that is equal to 12; and
- a PDSCH decoding time $N_{1,0}$ that is equal to 14 in response to determining that the minimum SCS is 15 kHz and the PDSCH DM-RS is configured.

11. A user equipment (UE) for wireless communication, the UE comprising:
- at least one processor; and
- at least one non-transitory machine-readable medium coupled to the at least one processor and storing one or more instructions that, when executed by the at least one processor, cause the UE to:
- receive a timing advance command in an uplink slot n; and
- determine, according to a time when the timing advance command is received, a time for applying an uplink transmission timing adjustment starting from a start of an uplink slot n+k+1,
wherein:
- k is determined according to a duration of $N_1$ symbols,
- n, k, and $N_1$ are all integers, and
- a value of $N_1$ corresponds to at least one of the following:
- a physical downlink shared channel (PDSCH) decoding time defined by PDSCH processing capability 1 in response to determining that a reference processing capability assumption is true, and
- a PDSCH decoding time defined by the PDSCH processing capability 1 in response to determining that a PDSCH demodulation reference signal (DM-RS) is configured, wherein:
  - the PDSCH decoding time is determined based on a minimum subcarrier spacing (SCS) among SCSs of all configured uplink bandwidth parts (BWPs) for all uplink carriers in a timing advance group (TAG) and SCSs of all configured downlink BWPs for corresponding downlink carriers, and
  - $N_1$ is 14 in response to determining that the minimum SCS is 15 kHz.

* * * * *